Patented Oct. 17, 1950

2,526,417

UNITED STATES PATENT OFFICE 2,526,417

PYRROLIDYLALKYLAMINO CHLORO-QUINOLINE COMPOUND

Robert H. Reitsema, Kalamazoo, Mich., assignor to The Upjohn Company, Kalamazoo, Mich., a corporation of Michigan No Drawing. Application January 13, 1949,
Serial No. 70,800

2 Claims. (Cl. 260—288)

This invention relates to anti malarials and is more particularly concerned with the compound 7-chloro-4-[1'-methyl-4'-(1''-pyrrolidyl)-butylamino]-quinoline having the formula:

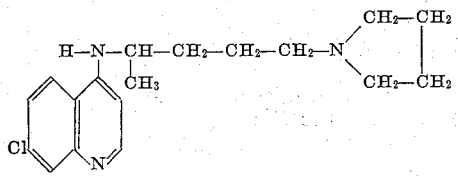

and acid addition and quaternary ammonium salts thereof.

It is an object of the present invention to provide a novel group of compounds possessing utility as therapeutics for the treatment of malaria. Another object of the present invention is to provide novel antimalarials containing the pyrrolidyl nucleus. Other objects will become apparent hereinafter.

The foregoing and additional objects are accomplished by the provision of 7-chloro-4-[1'-methyl - 4'-(1''-pyrrolidyl)-butylamino]-quinoline and acid addition and quaternary ammonium salts thereof. These novel compounds have been found to exhibit high antimalarial activity against Plasmodium gallinaceum in chicks and against Plasmodium lophurae in ducks when administered orally. These are both recognized "screening" tests for antimalarial activity.

The free base of the present invention may be conveniently prepared by the reaction of 5-pyrrolidyl-2-aminopentane with 4,7-dichloroquinoline at an elevated temperature. The hydrochloride of the free amine thus obtained may then be treated with an aqueous solution of a strong alkali, e. g., sodium or potassium hydroxide, to obtain the free amine. The free amine may be isolated by extraction with ether, removal of the ether, fractional distillation, and crystallization from methylcyclohexane or other suitable solvent.

Quaternary ammonium salts of the present invention, which are for some applications even more desirable than the free base, such as therapeutic agents, may be prepared in any convenient manner known in the art, as by mixing the free base with an acid in stoichiometric proportions, either in the presence of an organic solvent in which the salt is insoluble so that precipitation occurs upon formation thereof, or merely admixing solutions of the acid and amine and evaporating to dryness to yield the solid salt. Representative acids which may be used are formic, acetic, citric, picric, sulfuric, hydrochloric, hydrobromic, hydriodic, phosphoric, succinic, salicyclic, and others. Acid addition salts may be formed with the nitrogen atom of the pyrrolidyl group as well as with the secondary nitrogen atom which is present in the molecule of the compound of the present invention. Whether the mono- or di-addition salt is produced is dependent upon the relative proportions of the basic amine and salt-forming agent used in preparing the salt. Other compounds which may be used to form quaternary ammonium salts are alkyl halides, aralkyl halides, and alkyl esters of arylsulfonic acids, such as, for example, methyl iodide, methyl bromide, cetyl bromide, myristyl iodide, lauryl bromide, benzyl chloride, allyl bromide, ethyl (para-toluene)-sulfonic acid, et cetera, in which case the free amine and salt-forming agent are merely mixed together, heated to complete the reaction, and the salt thereafter isolated. The quaternary ammonium salts are, in some instances, also valuable as surface-tension depressants and wetting agents.

The following examples are given to illustrate the present invention but are in no way to be construed as limiting.

*Example 1—5-(1'-pyrrolidyl)-pentanone-2*

A solution of 150 grams of 2-(1'-pyrrolidyl)-ethyl chloride in 100 milliliters of benzene was added dropwise to a suspension of the sodium enolate of ethyl acetoacetate (obtained from 147 grams of ethyl acetoacetate and 26 grams of metallic sodium) in one liter of boiling benzene and heated under reflux for ten hours. The mixture was cooled, a solution of 75 milliliters of concentrated sulfuric acid in 160 milliliters of water and 140 grams of ice was added, and the resulting aqueous layer separated and washed with benzene. The acidic aqueous solution of ethyl α - [β'-(1-pyrrolidyl)-ethyl]-acetoacetate sulfate was heated under reflux for seventeen hours, cooled, 430 milliliters of cold thirty percent sodium hydroxide solution added, the resulting oily organic layer separated, the aqueous layer extracted three times with 100-milliliter portions of benzene, the organic layer and benzene extracts combined, dried, benzene removed, and the residue distilled under reduced pressure. There was thus obtained 129 grams of 5-(1'-pyrrolidyl)-pentanone-2, distilling at 92–98 degrees centigrade at a pressure of 11–13 millimeters of mercury. Redistillation gave 98.2 grams of pure 5-(1''-pyrrolidyl)-pentanone-2 ($n_D^{25}$ 1.4589), distilling at 93–95 degrees centigrade at a pressure of 11 millimeters of mercury.

Example 2—5-(1'-pyrrolidyl)-2-aminopentane

A solution of 44.0 grams of 5-(1'-pyrrolidyl)-pentanone-2 in 100 milliliters of anhydrous methanol, containing 100 milliliters of anhydrous ammonia, was reduced under a hydrogen pressure of 900 pounds per square inch in the presence of Raney nickel at 100 degrees centigrade. After the absorption of hydrogen had ceased, the reaction mixture was cooled, the catalyst and solvent removed, and the residue distilled under reduced pressure. There was obtained from two reductive aminations as above, 86.8 grams of 5-(1'-pyrrolidyl)-2-aminopentane ($n_D^{25}$ 1.4665), distilling at 92–97 degrees centigrade at a pressure of 11–12 milimeters of mercury. When further purified through the dithiocarbamate by the method of Jones [Ind. Eng. Chem., Anal. Ed. 7, 431 (1944)], 5-(1'-pyrrolidyl)-2-aminopentane, distilling at 93–94 degrees centigrade at a pressure of 11 millimeters of mercury $n_D^{20}$ 1.4674, was obtained.

The picrate was prepared, and, after crystallization from ethanol, found to melt at 148–149 degrees centigrade.

Analysis

Calc'd. for $C_{21}H_{26}N_8O_{14}$: C 41.04 H 4.27
Found: 41.06 4.27

Example 3—7-chloro-4-[1'-methyl-4'-(1''-pyrrolidyl)-butylamino]-quinoline

A mixture of 29 grams of 4,7-dichloroquinoline and 50 grams of 5-(1'-pyrrolidyl)-2-aminopentane was heated with stirring to 160–170 degrees centigrade for about six hours, cooled, and dissolved in 120 milliliters of 50 percent aqueous acetic acid. One hundred milliliters of ether and 140 milliliters of 30 percent sodium hydroxide were added, the mixture agitated vigorously, the ether layer separated, and the aqueous layer extracted an additional three times with 100-milliliter portions of ether. The ether solutions were combined, dried, the ether removed, and the residue distilled under reduced pressure, 20.1 grams of unreacted 5-(1'-pyrrolidyl)-2-aminopentane being recovered. The residue was crystallized from 125 milliliters of methylcyclohexane and 35 grams of light-yellow crude crystalline product, melting at 98–107 degrees centigrade was obtained. Three additional crystallizations from methylcyclohexane yielded seventeen grams of pure 7-chloro-4-[1'-methyl-4'-(1''-pyrrolidyl)-butylamino]-quinoline in the form of white needles, melting at 110–111 degrees centigrade.

Analysis

Calc'd. for $C_{18}H_{24}N_3Cl$: C 68.01 H 7.61 N 13.22
Found: 68.11 7.52 12.68

Various modifications may be made in the present invention without departing from the spirit or scope thereof, and it is to be understood that I limit myself only as defined in the appended claims.

I claim:

1. A compound selected from the group consisting of (1) 7-chloro-4-[1'-methyl-4'-(1''-pyrrolidyl)-butylamino]-quinoline of the formula:

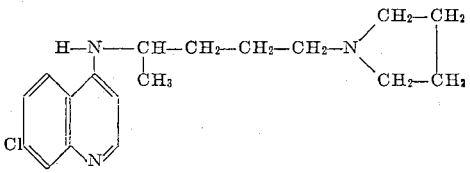

and (2) acid addition and quaternary ammonium salts thereof.

2. 7-chloro-4-[1'-methyl-4'-(1''-pyrrolidyl)-butylamino]-quinoline.

ROBERT H. REITSEMA.

REFERENCES CITED

The following references are of record in the file of this patent:

UNITED STATES PATENTS

| Number | Name | Date |
| --- | --- | --- |
| 1,938,047 | Schonhofer et al. | Dec. 5, 1933 |
| 2,233,970 | Andersag et al. | Mar. 4, 1941 |
| 2,419,199 | Burckhalter et al. | Apr. 22, 1947 |

OTHER REFERENCES

Sidgwick: "Organic Chemistry of Nitrogen" (Oxford University Press; 1937) pages 492 and 538.

Schonhofer: Zeit. physiol. Chemie, vol. 274, pp. 1–8 (1942).

Surrey et al.: J. Am. Chem. Soc., vol. 68, pp. 113–116 (Jan. 1946).